(12) United States Patent
Shustef

(10) Patent No.: US 9,329,810 B2
(45) Date of Patent: May 3, 2016

(54) SECURE FEDERATION OF CLOUD PRINT SERVICES

(75) Inventor: Yevgeniy Shustef, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 10 days.

(21) Appl. No.: 13/334,523

(22) Filed: Dec. 22, 2011

(65) Prior Publication Data

US 2013/0163027 A1 Jun. 27, 2013

(51) Int. Cl.
*G06K 15/02* (2006.01)
*G06F 3/12* (2006.01)
*H04L 29/06* (2006.01)

(52) U.S. Cl.
CPC .............. *G06F 3/1204* (2013.01); *G06F 3/126* (2013.01); *G06F 3/1226* (2013.01); *G06F 3/1288* (2013.01); *H04L 63/0209* (2013.01); *G06F 3/1228* (2013.01)

(58) Field of Classification Search
CPC . H04L 63/0209; G06F 3/1204; G06F 3/1288; G06F 3/126; G06F 3/1226; G06F 3/1228
USPC ...................... 358/1.14–1.15; 709/203; 726/1
See application file for complete search history.

(56) References Cited

U.S. PATENT DOCUMENTS

| 7,102,777 B2 * | 9/2006 | Haraguchi | G06K 15/00 358/1.1 |
| 7,443,523 B2 * | 10/2008 | Leone, III | G06F 3/1205 358/1.13 |
| 7,542,156 B2 * | 6/2009 | Sattler | G06F 3/1206 358/1.14 |
| 8,104,069 B2 * | 1/2012 | Thurm | G06Q 10/10 726/1 |
| 8,275,851 B1 * | 9/2012 | Sakata | G06F 9/541 709/213 |
| 2001/0018660 A1 * | 8/2001 | Sehr | G06Q 10/02 705/5 |
| 2005/0138065 A1 * | 6/2005 | Ciriza | G06Q 10/10 |
| 2005/0267968 A1 * | 12/2005 | Fearing | H04L 29/12066 709/224 |
| 2006/0158684 A1 * | 7/2006 | Partanen | G06F 3/1222 358/1.15 |
| 2007/0086430 A1 * | 4/2007 | Kemp | H04L 67/02 370/352 |
| 2008/0052026 A1 * | 2/2008 | Amidon | H04N 5/23203 702/104 |
| 2009/0068999 A1 * | 3/2009 | Chen | H04W 8/265 455/414.2 |
| 2010/0027050 A1 * | 2/2010 | Regnier | H04N 1/00204 358/1.15 |
| 2010/0151818 A1 * | 6/2010 | Miller | G06Q 50/188 455/406 |
| 2010/0153536 A1 * | 6/2010 | Miller | H04W 12/06 709/224 |
| 2011/0028135 A1 * | 2/2011 | Srinivasan | H04M 3/42382 |

(Continued)

*Primary Examiner* — Tammy Pham
*Assistant Examiner* — Edwin S Leland, III
(74) *Attorney, Agent, or Firm* — Fay Sharpe LLP

(57) ABSTRACT

A method and system are disclosed for federation among cloud print services. Based upon identification data and location data received from a user device, a primary cloud print service determines the best document processing device for output of a document. The primary cloud print service uses trusted relationships with other cloud print services, established via secure sharing of information, to allow for transparent printing across clouds to any device registered by the user or available and proximate to the user's location.

20 Claims, 6 Drawing Sheets

(56) References Cited

U.S. PATENT DOCUMENTS

| | | | | |
|---|---|---|---|---|
| 2011/0131406 A1* | 6/2011 | Jones | H04L 65/1053 | 713/150 |
| 2011/0138050 A1* | 6/2011 | Dawson | G06F 9/5072 | 709/226 |
| 2011/0153727 A1* | 6/2011 | Li | G06F 6/5055 | 709/203 |
| 2011/0167469 A1* | 7/2011 | Letca | G06F 21/6218 | 726/1 |
| 2011/0314532 A1* | 12/2011 | Austin | H04L 9/3213 | 726/8 |
| 2011/0314533 A1* | 12/2011 | Austin | H04L 63/08 | 726/9 |
| 2012/0011578 A1* | 1/2012 | Hinton | H04L 9/3228 | 726/8 |
| 2012/0050794 A1* | 3/2012 | Ikeda | G06F 3/1205 | 358/1.15 |
| 2012/0057193 A1* | 3/2012 | Jazayeri | G06F 3/1204 | 358/1.15 |
| 2012/0072985 A1* | 3/2012 | Davne | H04L 63/0272 | 726/22 |
| 2012/0113458 A1* | 5/2012 | Benedek | G06F 3/1204 | 358/1.15 |
| 2012/0117229 A1* | 5/2012 | Van Biljon | G06Q 30/04 | 709/224 |
| 2012/0120437 A1* | 5/2012 | Nanaumi | G06F 3/1205 | 358/1.15 |
| 2012/0250609 A1* | 10/2012 | George | H04M 3/42289 | 370/328 |
| 2012/0254957 A1* | 10/2012 | Fork | G06F 21/33 | 726/6 |
| 2012/0268769 A1* | 10/2012 | Kashioka | G06F 3/1204 | 358/1.14 |
| 2012/0290348 A1* | 11/2012 | Hackett | G06Q 10/06 | 705/7.13 |
| 2012/0300249 A1* | 11/2012 | Shustef | G06F 3/1287 | 358/1.15 |
| 2013/0007845 A1* | 1/2013 | Chang | G06F 21/62 | 726/4 |
| 2013/0013284 A1* | 1/2013 | Wang | G06Q 10/06 | 703/22 |
| 2013/0046807 A1* | 2/2013 | Sakata | G06F 9/541 | 709/201 |
| 2013/0046970 A1* | 2/2013 | Abe | H04L 63/168 | 713/152 |
| 2013/0060839 A1* | 3/2013 | Van Biljon | G06Q 30/04 | 709/203 |
| 2013/0107324 A1* | 5/2013 | Kamath | G06F 3/1222 | 358/1.15 |
| 2013/0145419 A1* | 6/2013 | Hu | G06Q 10/063 | 726/1 |
| 2013/0155441 A1* | 6/2013 | Hong | G06F 3/1222 | 358/1.14 |

* cited by examiner

SECURE FEDERATION OF CLOUD PRINT SERVICES

TECHNICAL FIELD

The exemplary embodiment relates to a system and method for secure federation of print devices in a cloud printing environment. While the systems and methods described herein relate to cloud print services, it will be appreciated that the described techniques may find application in other printing environments or other networks.

BACKGROUND

Traditionally, printing is done behind a firewall using either network connected or locally connected devices, where document submission, conversion and printing happen in the same environment. With the rapid emergence of cloud-based printing options, some or all of the activities are moving to a remote network of computers and servers, commonly referred to as "the cloud." For example, the cloud can perform document conversion, instead of having the device that submitted the print job perform the conversion. This can free resources, such as processing power, on the submitting device. Also, users of mobile devices (or other users that want to print to the cloud) would like to do so by connecting to a printer without installing a driver (e.g. by emailing a file, web submission of a file to a print device connected to the cloud).

Typically, mobile print providers expose a variety of options to access personal and commercial printing devices, as well as document submission methods. While doing so, mobile print providers may rely on application programming interfaces (APIs) that rely on proprietary and/or custom interfaces. Also, each provider's cloud database may contain the complete list of devices and the respective capabilities of the devices. As a result, a given API is limited and locked to a specific print provider.

INCORPORATION BY REFERENCE

The following references, the disclosures of which are incorporated herein by reference in their entireties, are mentioned:

1. U.S. Pat. No. 7,443,523 to Anthony J. Leone III, et al., entitled PRINTING TO A CLIENT SITE FROM AN APPLICATION RUNNING ON A REMOTE SERVER, issued on Oct. 28, 2008. The disclosure of which is incorporated herein by reference in its entirety.

BRIEF DESCRIPTION

In some illustrative embodiments disclosed as illustrative examples herein, a federation method among cloud print services includes, with a processor, receiving identification data representative of an identification of an associated user via a primary cloud print service, and aggregating data representative of one or more additional trusted cloud print services by the primary cloud print service so as to generate a federation thereof. The method also includes receiving selection data corresponding to a cloud print service selected from among the federation of one or more additional trusted cloud print services, and retrieving, from the selected additional trusted cloud print service, data representative of at least one document processing device registered in accordance with the received identification data. In addition, the method includes receiving selection data corresponding to a selected document processing device associated with the selected cloud print service, and communicating job data representative of a document processing operation to the selected document processing device for processing.

In some illustrative embodiments disclosed as illustrative examples herein, a method for federating document processing devices among cloud print services includes, with a processor receiving a request to initiate cloud printing by a primary cloud printing service, the request comprising at least one of identification data and location data, and querying at least one additional trusted cloud print service in accordance with the received at least one of identification data and location data for at least one document processing device available in accordance therewith. The method also includes aggregating data representing one or more available document processing devices on each cloud printing service in response to the query thereof by the primary cloud print service, and receiving selection data corresponding to a selected document processing device from among the one or more available document processing devices. In addition, the method includes communicating job data representative of a document processing operation to the selected document processing device for processing thereon.

In some illustrative embodiments disclosed as illustrative examples herein, a system for federating document processing devices among cloud print services includes a processor, memory that stores data representing trusted relationships among one or more cloud print services, and a communications interface operative to communicate data among the one or more cloud print services. The memory is in communication with the processor, which stores instructions which are executed by the processor for establishing a trusted relationship with at least one additional cloud print service via the communications interface, and for receiving a request to initiate cloud printing, wherein the request includes at least one of identification data and location data. The instructions are also for aggregating data representative of trusted cloud print services so as to generate a federation thereof, and receiving selection data corresponding to a selected cloud print service from among the federation of trusted cloud print services. In addition, the instructions are for retrieving, from the selected trusted cloud print service, data representative of at least one document processing device registered in accordance with the received identification data, and receiving selection data corresponding to a selected document processing device associated with the selected trusted cloud print service. The instructions further are for communicating job data representative of a document processing operation to the selected document processing device for processing thereon.

DETAILED DESCRIPTION

Figure 1:
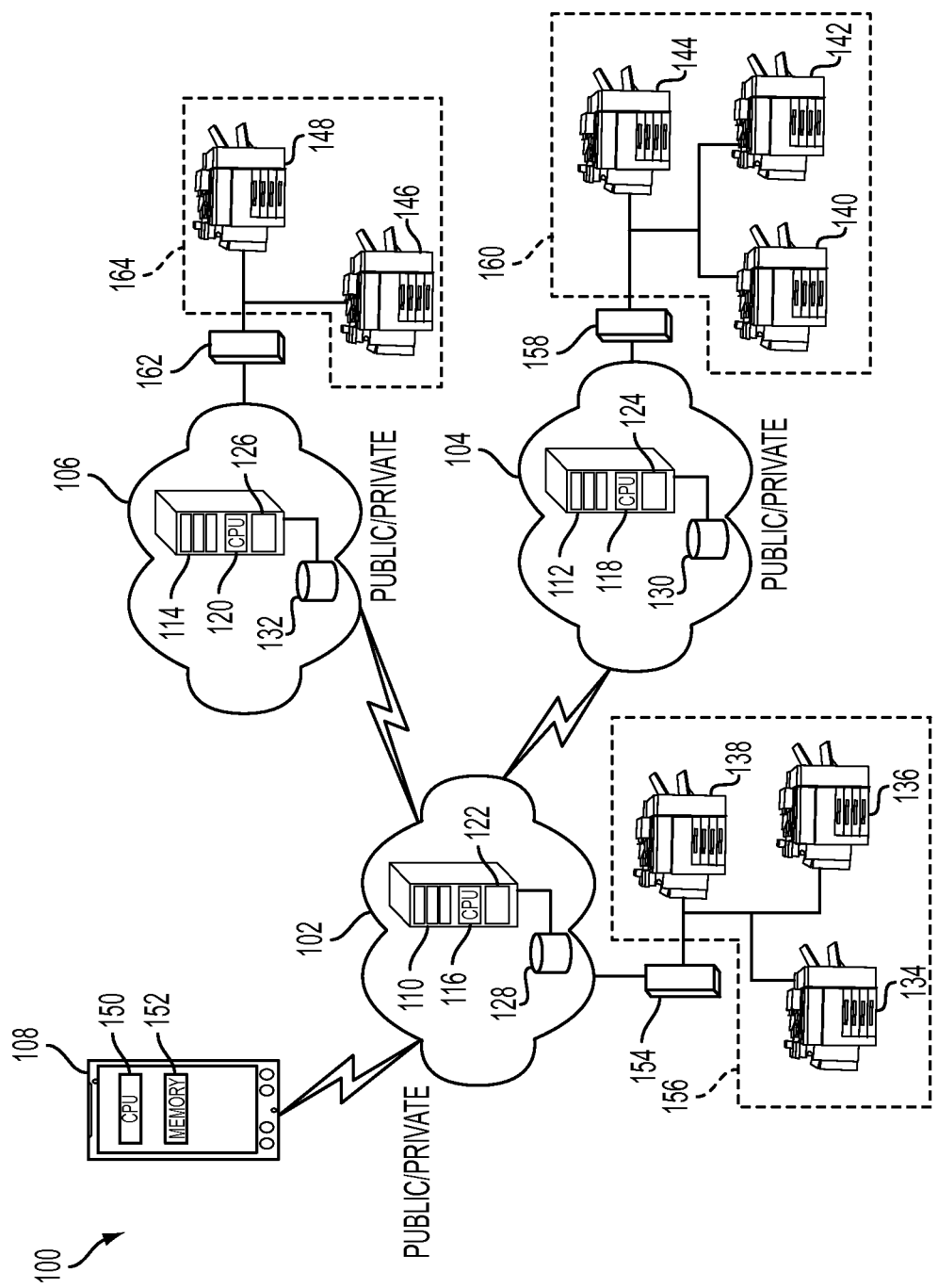
FIG. 1 illustrates a system capable of implementing the systems and methods for federation of cloud print services according to one embodiment of the subject application.

One or more implementations of the subject application will now be described with reference to the attached drawings, wherein like reference numerals are used to refer to like elements throughout. In accordance with various features described herein, systems and methods are described that facilitate federation of printers in a cloud printing environment.

Turning now to FIG. 1, there is shown an example system 100 upon which the systems and methods for federation of cloud print services may be implemented. The system 100 includes a plurality of cloud print service providers, designated is 102, 104, and 106. In accordance with one embodiment described herein, the clouds 102, 104, and 106 are illustrated in FIG. 1 as representative of cloud print services, which may be public services (store or non-subscription based services) or private services (subscription services, restricted access, etc.), and the devices depicted therein are illustrative in nature. It will therefore be appreciated that the various components depicted in FIG. 1 are for purposes of illustrating aspects of the subject application, and that other similar components, implemented via hardware, software, or a combination thereof, are capable of being substituted therein. Each cloud 102, 104, and 106 may include one or more servers 110, 112, and 114, respectively, which are representative of any computing systems that comprise at least processors 116, 118, and 120 (described in greater detail as the processor 402 of FIG. 4) that executes, and memory 122, 124, and 126 (described in greater detail below as the memory 404 of FIG. 4) that stores computer-executable instructions for providing the various functions, calculations, selections, and the like, described herein.

According to one embodiment, the clouds 102, 104, and 106 include access to myriad computing devices, in data communication with each other via suitable connections therebetween. For example, the primary cloud 102 illustrates the server 110 in data communication with at least three other devices, shown in FIG. 1 as the document processing devices 134, 136, and 138 accessible from the cloud 102 through a firewall 154 in a local environment 156. Similarly, the cloud 104 may include a server 112 in data communication with document processing devices 140, 142, and 144 accessible from the cloud 104 through a firewall 158 in a local environment 160; whereas the server 114 disposed on the cloud 106 may be in data communication with document processing devices 146 and 148 accessible from the cloud 106 through a firewall 162 in a local environment 164. It will be appreciated that the clouds 102, 104, and 106 may employ network connection protocols, thereby allowing data communication between the servers 110, 112, and 114 and the document processing devices 134, 136, and 138, 140, 142, and 144, and 146 and 148, respectively. It will further be appreciated that the local environments 156, 160, and 164 may correspond to public environments, e.g., a store front, library, or other network, private environments, e.g., a company network, university campus, or the like.

According to one embodiment of the subject application, data communication within the clouds 102, 104, and 106 may be accomplished via suitable communications links, which include, for example and without limitation, 802.11a, 802.11, 802.11g, 802.11(x), WiMax, Bluetooth, the public switched telephone network, a proprietary communications network, infrared, optical, or any other suitable wired or wireless data transmission communications known in the art. Various network protocols, implementations or models may be used within the clouds 102, 104, and 106 to facilitate communications amongst the various components resident thereon including, for example and without limitation, TCP/IP, token rings, Ethernet, WAN, VLAN, WLAN, Internet, other packet-switching protocols, or the like.

It will also be appreciated that while not shown, the cloud 102 may include various other computing devices in data communication with the server 110, such as, for example and without limitation, personal computers, workstations, tablets, smart phones, netbooks, laptops, and the like. In accordance with on embodiment of the subject application, the various devices of the clouds 102, 104, and 106 may be located in physical proximity thereto, or dispersed across a broad geographical area.

The servers 110, 112, and 114 may include processing units 116, 118, and 120 (see, e.g., FIG. 4), system memory 122, 124, and 126 (see, e.g., FIG. 4), data storage 128, 130, and 132 (see, e.g., 408 and 416 of FIG. 4), and system buses (such as the bus 412 of FIG. 4) that couples various system components including the system memory 122, 124, and 126 to the processing units 116, 118, and 120. The processing units 116, 118, and 120 can be any of various commercially available processors, e.g., single-core processors, a dual-core processors (or more generally by multiple-core processors), digital processors and cooperating math coprocessors, digital controllers, or the like. The processing units 116, 118, and 120, in addition to facilitating the operations of the respective clouds 102, 104, and 106, executes instructions stored in memory 122, 124, and 126 for performing the methods outlined in FIGS. 2A, 2B, and 3, as described more fully below.

The data storage 128, 130, 132, may be any mass storage device known in the art including, for example and without limitation, magnetic storage drives, a hard disk drive, optical storage devices, flash memory devices, or any suitable combination thereof. In one embodiment, the data storage 128, 130, 132 is suitably adapted to store scanned image data, modified image data, redacted data, user information, document data, image data, electronic database data, or the like. It will be appreciated by those skilled in the art that while illustrated in FIG. 1 as being a separate component of the system 100, the data storage 128, 130, 132 is capable of being implemented as an internal storage component of the servers 110, 112, and 114, or the like, such as, for example and without limitation, an internal hard disk drive, or the like. In accordance with one embodiment of the subject application, the data storage 128, 130, 132 is capable of storing documents, user account information, user device registration data, document processing device information, security data, security tokens, usage data, user interface data, job control data, status data, images, user information, location information, map data, multimedia files, fonts, and the like. According to one embodiment, the data storage 128, 130, and 132 stores data representative of a database of registered devices, e.g., document processing devices 134-148, user identification data corresponding to the document processing devices 134-148, or the like. Thus, it will be appreciated that the data storage 128, 130, and 132 may also be referenced herein as "databases 128, 130, and 132."

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

It will be appreciated that the servers 110, 112, and 114 in the clouds 102, 104, and 106 are representative of computing devices that are capable of facilitating interaction among disparate other computing devices in data communication therewith, such as, for example and without limitation, the document processing devices 134-148. In accordance with one embodiment of the subject application, the servers 110, 112, and 114 are capable of being employed as one possible hardware configuration to support the systems and methods described herein. It will be appreciated that although the servers 110, 112, and 114 are illustrated as standalone computing devices, any suitable computing environment is capable of being employed in accordance with the subject application. For example, computing architectures including, but not limited to, multiprocessor, distributed, tablet, mainframe, supercomputer, digital and analog can be employed in accordance with the one embodiment of the subject application. It will further be appreciated that the servers 110, 112, and 114 may include computer workstations, personal computers, combinations thereof, or any other computing devices.

In accordance with one embodiment, the various components of the clouds 102, 104, and 106 are in data communication with each other via suitable communications links, enabling the servers 110, 112, and 114 to respectively communicate with and receive communications from each other server 110, 112, and 114. As will be understood, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. According to one embodiment, the clouds 102, 104, and 106, via the respective servers 110, 112, and 114, or other suitable devices, establish trusted relationships therebetween via token exchange, certificates, shared security data, or other such means for establishing trusted relationships amongst diverse devices.

It will be appreciated that establishing trust between cloud print services facilitates secure communication across clouds. Cloud print service providers 102, 104, and 106 can exchange security tokens to authorize secure communication with one another. For example, a first cloud print service 102 contacts a second cloud print service 104 or 106 to initiate the creation of trust certificates. Each cloud print service 102, 104, and 106 then creates a trust certificate. For example, the trust certificate may be formatted in accordance with the X.509 standard for a public key infrastructure (PKI) for single sign-on (SSO). The trust certificates are exchanged among the cloud print services 102, 104, and 106, facilitating the use of common sign-on information among the cloud print services. According to one embodiment, databases of the data storage 128, 130, and 132 (as set forth in greater detail above), are updated to show the trusted relationship that the cloud print service providers 102, 104, and 106 have established. In accordance with one embodiment described herein, establishing a trusted network of cloud print services allows common user information to be exchanged between cloud print services while maintaining integrity and security of the information. It will also be appreciated that this eliminates the need for a user to remember multiple usernames and passwords for various services.

It will further be appreciated that while depicted as servers 110, 112, 114 and document processing devices 134-148, the devices of the clouds 102, 104, and 106 may comprise any number of different or like devices. For example purposes, the document processing devices 134-148 are suitably adapted to perform a variety of document processing operations, including, for example and without limitation, scanning, copying, facsimile transmissions, printing, electronic mail communications, document management, document storage, or the like.

Also illustrated in data communication with the primary cloud 102 in FIG. 1 is a user device 108, illustrated as a smart cellular telephone. It will be appreciated that the user device 108 is shown in FIG. 1 as a smart cellular telephone for illustration purposes only, and that the device 108 is representative of any personal computing device known in the art including, for example and without limitation, a personal computer, a netbook computer, a laptop computer, a workstation computer, a personal data assistant, a web-enabled cellular telephone, a smart phone, a proprietary network device, or other web-enabled electronic device. It will be appreciated that the data communications between the primary cloud 102 and the user device 108 may be accomplished via any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications.

In accordance with one embodiment of the subject application, the user device 108 is suitably configured to interact with the cloud 102 to facilitate document processing by the clouds 102, 104, and 106, interact with associated multifunction devices 134-148, and the like. The user device 108 may further include a web-browser operable to interact with the clouds 102, 104, and 106, via the servers 110, 112, and 114, respectively. It will be appreciated that other communications interfaces may also be used in accordance with the systems and methods described herein. According to one embodiment of the subject application, the user device 108 includes at least one application programming interface (API), that is configured to communicate with a primary cloud print service 102, 104, or 106 (as discussed in greater detail hereinafter).

The user device 108 depicted in FIG. 1 may include a processor 150, system memory 152, system, storage, buses that couples various system components including the system memory 152 to the processing unit 150, and the like. According to one embodiment, the user device 108 includes at least one application programming interface, user identification data, document processing device data, a browser, and the like. It will be appreciated that the system memory 152 may be a hard drive, virtual drive, random access memory, read only memory, flash memory, optical drive, or other suitable storage means.

The processing unit 150 can be any various commercially available processor, e.g., a single-core processor, a dual-core processor (or more generally by multiple-core processors), a digital processor and cooperating math coprocessor, a digital controller, or the like. The processing unit 150 may be configured to execute instructions stored in memory 152 for performing methods, operations, communications, or the like, in accordance with the methodologies discussed herein.

Figure 2A:
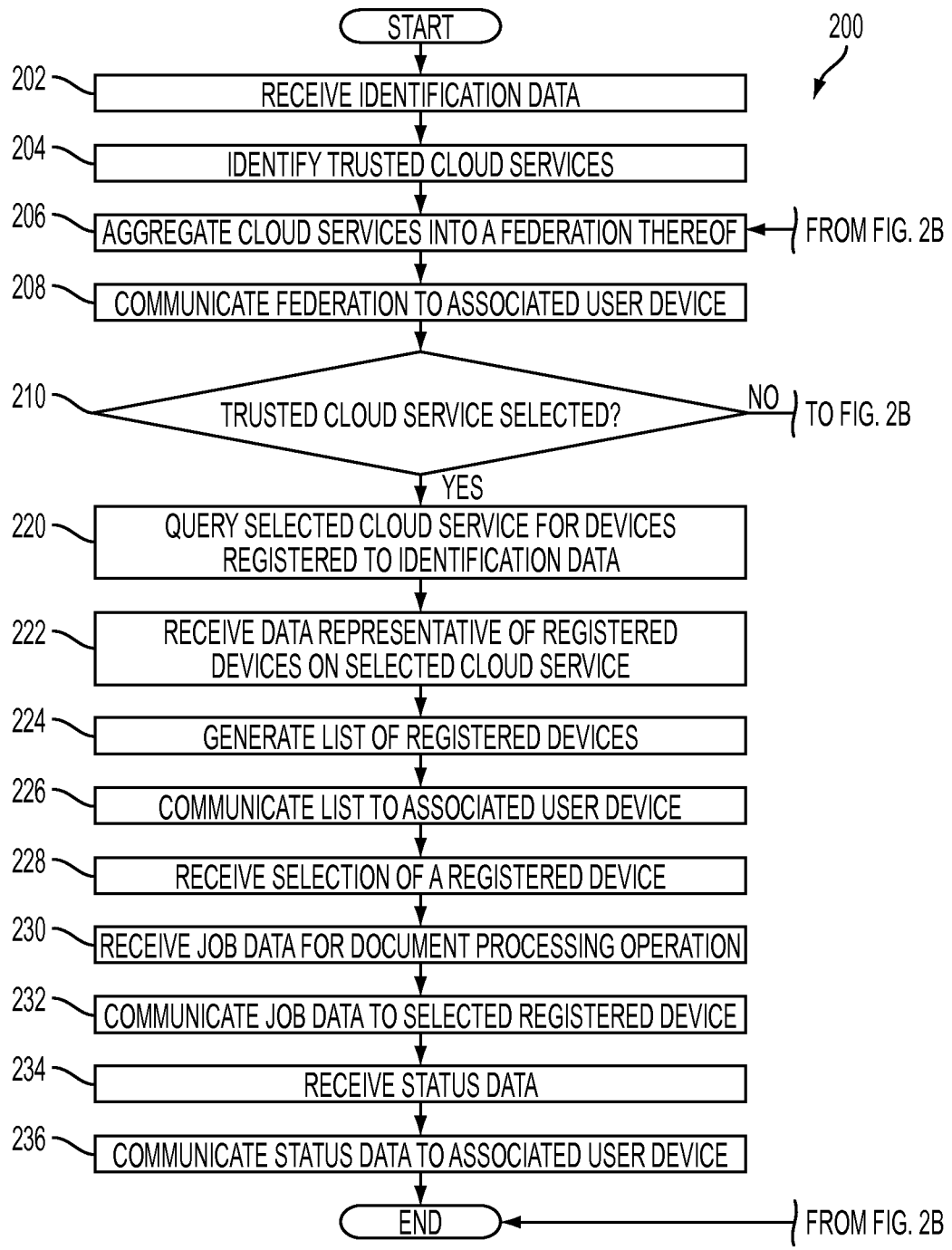
FIGS. 2A-2B illustrate an example methodology for federating cloud print services in accordance with one embodiment of the subject application.
Figure 2B:
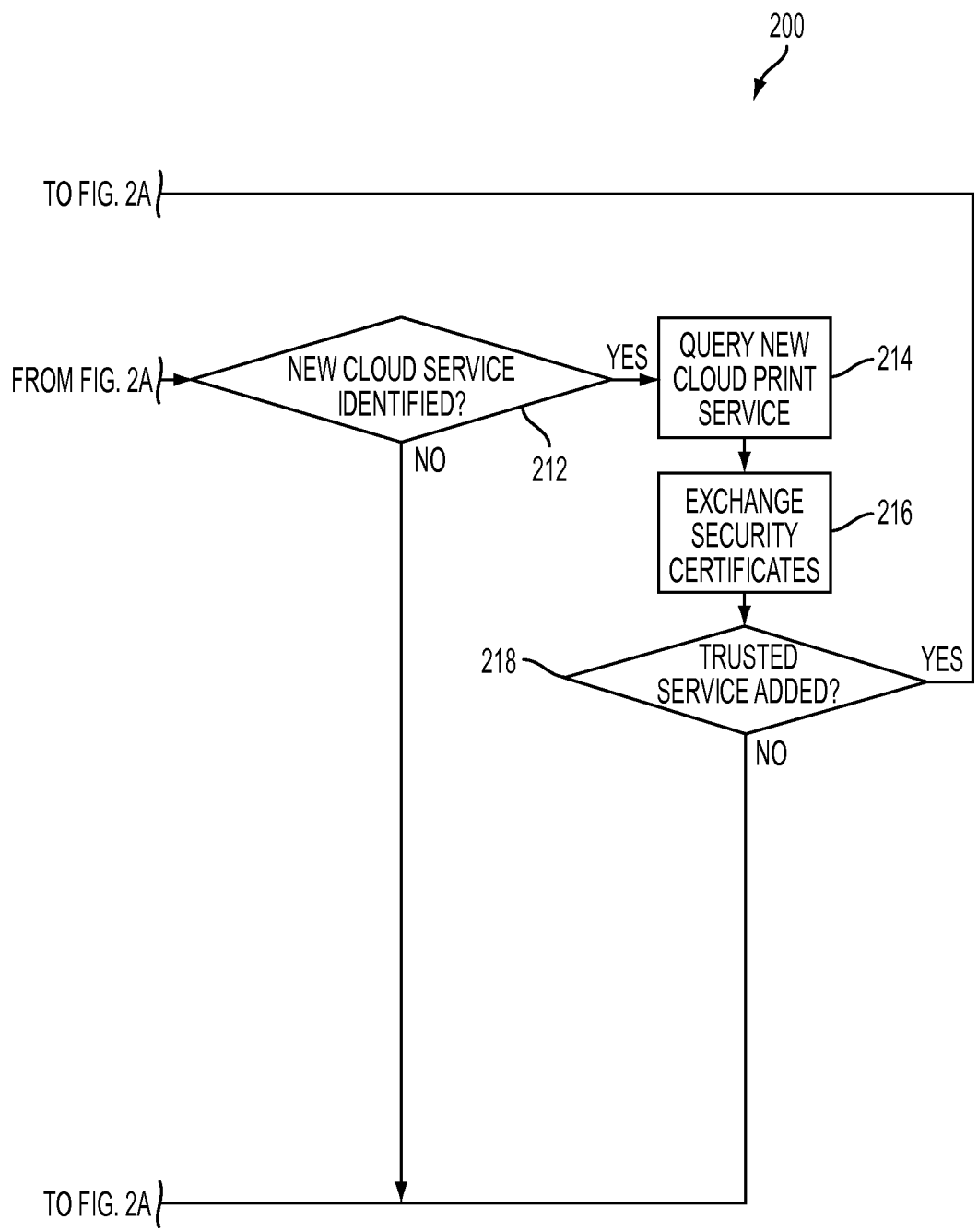

Referring now to FIGS. 2A-2B, there is shown a flowchart 200 illustrating one example methodology for facilitating federation of cloud print services in accordance with one embodiment of the subject application. At 200, identification data is received by the server 110 or other suitable component associated with the primary cloud print service 102. It will be understood that the cloud print service 102 is designated as the primary cloud print service for example purposes only, and any of the cloud services 102, 104, and 106 is capable of functioning in the role of primary as set forth in the methodology of FIGS. 2A-2B. According to one embodiment, the identification data is received by the server 110 via an application programming interface resident on the user device 108 that facilitates communications between the user device 108 and the primary cloud print service 102. It will be appreciated that such application programming interface is capable of being stored in memory 152 and implemented in accordance with operations of the processor 150 via the actions of an associated user. According to another embodiment, the identification data is received via a web-based service hosted on the primary cloud print service 102 via a browser operative on the user device 108. The identification data may include information corresponding to a user ID, password, security certificate, or other suitable data capable of identifying an associated user. According to one embodiment, the identification data includes an OpenID, i.e., logon information that is shared amongst a plurality of applications, websites, service providers, mail services, or the like.

The primary cloud print service 102 then identifies, at step 204, any additional trusted cloud print services 104 and 106. That is, the server 110 or other suitable component associated with the primary cloud print service 102 locates those additional cloud print services 104 and 106 with which the primary cloud print service 102 has established a trusting relationship. It will be appreciated that the primary service 102 is capable of establishing a trust relationship separately with each other service 104 and 106, together (service 104 trusts service 106, thereby allowing the trust to extend from the primary service 102 to the additional service 106 via operations of the additional service 104), or the like. According to one embodiment, the secure communication amongst the clouds 102, 104, and 106 may be accomplished via security tokens, certificates, e.g., X.509, during communications between the various clouds 102, 104, and 106.

The primary cloud print service 102, via the server 110 or other suitable component associated therewith, then aggregates, or federates, data representative of one or more additional cloud print services 104 and 106 at 206. According to one embodiment of the subject application, the federation of cloud print services 102-106 is accomplished in accordance with an established trust relationship existing between the primary service 102 and each additional service 104 and 106. In one such embodiment, data representative of the trusted cloud print services 104 and 106 is stored on the data storage 128. The aggregated, or federated, data is communicated to the user device 108 at 208 for selection of one of the cloud print services 102, 104, or 106. That is, an associated user is presented with the ability to select one of the trusted services 102, 104, or 106 with which particular document processing devices 134-148 are associated.

At 210, a determination is made whether one of the trusted cloud print services, i.e., one of the services 102, 104, or 106, has been selected. According to one embodiment, the server 110 or other suitable component associated with the primary cloud print service 102 analyzes data received from the user device 108 for an indication as to the selection of one of the cloud print services 102, 104, or 106. In the event that none of the trusted cloud print services 102, 104, or 106 has been selected, operations proceed to 212, whereupon a determination is made whether data has been received indicative of a new cloud print service (not shown) for which access is requested. For example, the associated user may desire to utilize devices present on a fourth cloud print service (not shown), with which the primary cloud print service 102 does not have a trusted relationship. If no such service is identified, operations with respect to FIGS. 2A-2B terminate. Upon a determination that a new cloud print service is selected, identification information corresponding to the new service may be received by the primary cloud print service 102.

At 214, the server 110 or other suitable component associated with the primary cloud print service 102 then queries the newly identified service for identification information, policy data, services available, security information, and the like. Certificates or tokens are then exchanged between the primary cloud print service 102 and the new printing service at 216. Upon a determination at 218 that a trusted relationship has been established, operations return to 206 for aggregation of all trusted cloud print services, including the newly added service. Upon a determination at 218 that a trusted relationship was not established, operations with respect to FIGS. 2A-2B terminate.

Returning to 210, when it is determined that one of the trusted cloud print services 102, 104, or 106 has been selected, operations progress to the retrieval of registered device information from the selected service 102, 104, or 106 at 220. Thus, at 220, the selected service 102, 104, or 106 is queried using the receiving identification data for any document processing devices 134-148 that have been registered with the identification data. According to one embodiment, an associated user may register a document processing device 134-148 associated with one of the cloud print services 102, 104, or 106 prior to the operations of FIGS. 2A-2B. For example, the associated user may register a home (non-public) document processing device 140 on the second trusted cloud print service 104 using the identification data referenced above, e.g., OpenID, shared logon, etc. In such an example, the server 112 associated with the second cloud print service 104 stores the registration, i.e., the correlation between the identification data and the document processing device 140, in the data storage 130.

At 222, data is received from the selected cloud print service 104 or 106 (104 in accordance with the previous example) corresponding to any document processing devices 140-148 that are registered in association with the identification data. That is, the server 112 or 114 associated with the selected cloud print service 104 or 106 searches data stored on the data storage 130 or 132 for any document processing devices 140-148 that are associated with the identification data received from the primary cloud print service 102. Thus, data corresponding to any such devices 140-148 is returned to the server 110 associated with the primary cloud print service 102.

A list is generated at 224 corresponding to all devices 140-148 registered with the identification data on the selected cloud print service 104 or 106. According to one embodiment, the list of document processing devices 140-148 may be communicated to the user device 108, or displayed via a web browser operative on the user device 108, or otherwise communicated to the associated user at 226. At 228, the server 110 or other suitable component associated with the primary cloud print service 102 receives selection data corresponding to a selected document processing device 140-148 associated with the selected cloud print service 104 or 106 that is registered to the identification data.

Job data representative of at least one document processing operation is then received by the server 110 or other component associated with the primary cloud print service 102 at 230. It will be appreciated that the job data may originate from the user device 108, may correspond to a document associated with the identification data that is stored in data storage 128, 130, or 132 of one of the cloud print services 102, 104, or 106, may correspond to a particular web page selected for output via the user device 108, or the like. According to one embodiment of the subject application, the job data may utilize a job print ticket schema so as to provide for standardized submission. The job data is then communicated at 232 by the server 110 of the primary cloud print service 102 to the server 112 or 114 of the selected cloud print service 104 or 106 on which is registered the selected document processing device 140-148.

According to one embodiment, the selected document processing device 140-148 then performs a document processing operation on the job data in accordance with information contained therein. Status data is received by the server 110 of the primary cloud print service 102 at 234 corresponding to the progress of the document processing operation performed by the selected document processing device 140-148. That is, data corresponding to the document processing operation is communicated from the device 140-148 to the respective server 112 or 114 and thereafter to the server 110 of the primary cloud print service 102. It will be appreciated that such status data may include, for example and without limitation, whether the job is completed, errors, successful transmission (if facsimile or email), or the like. The status information is then communicated by the server 110 or other suitable component of the primary cloud print service 102 at 236 to the user device 108 for display thereon via the application programming interface, to a webpage hosted by the server 110 and accessible by the browser of the device 108, or any other suitable communication means, e.g., text message, email, and the like.

Figure 3:
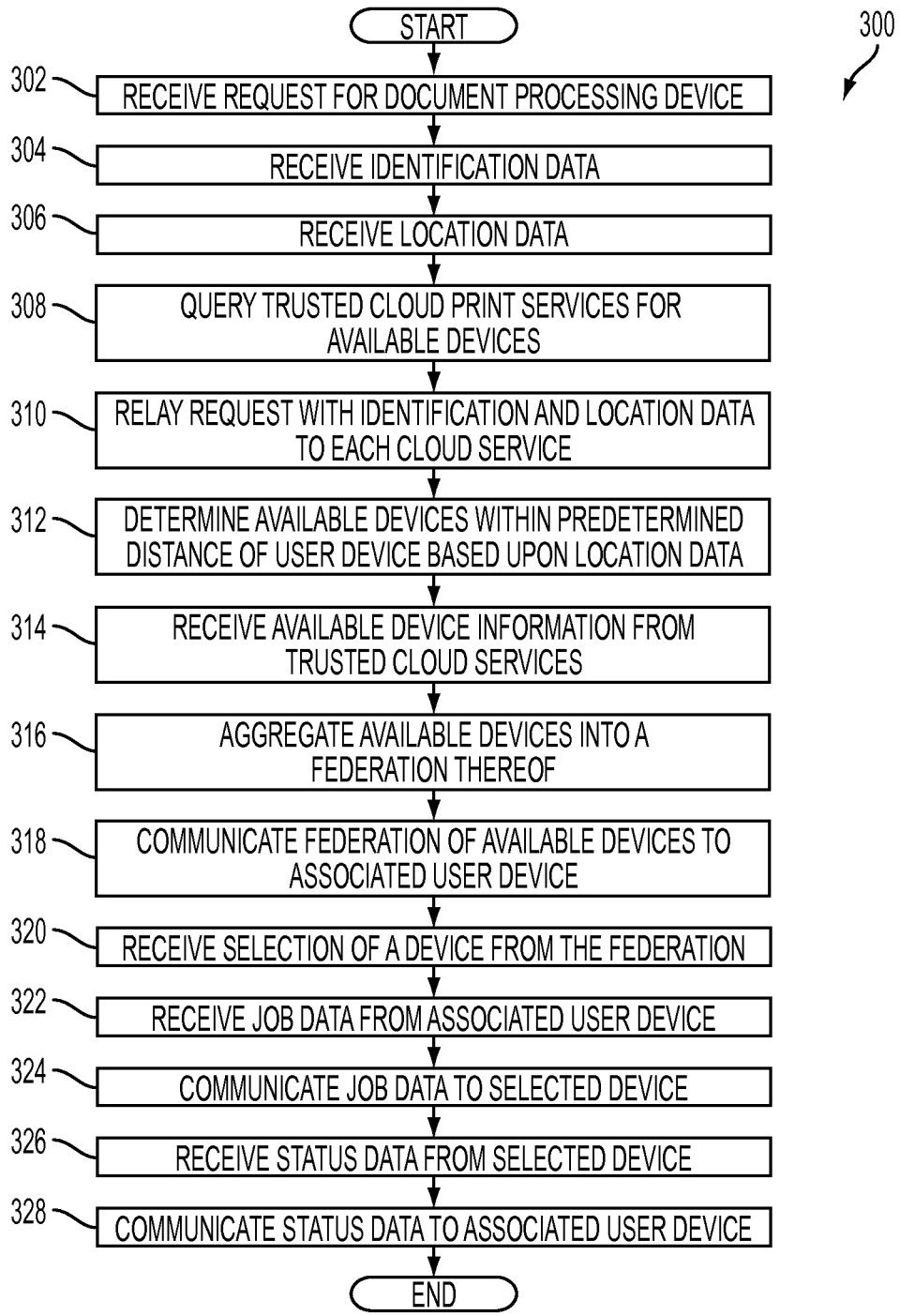
FIG. 3 illustrates an example methodology for federating document processing devices among cloud print services in accordance with one embodiment of the subject application.

Turning now to FIG. 3, there is illustrated an example implementation for federation among cloud print services in accordance with one embodiment of the subject application. For purposes of describing the methodology 300 of FIG. 3, reference is made hereinafter to the cloud print service 102 as the primary cloud print service. It will be understood that the use of the cloud print service 102 as the primary service is for example purposes only, and the primary service may be any of the cloud print services 102, 104, or 106 in accordance with the embodiments of the subject application. The methodology 300 of FIG. 3 begins at 302, whereupon a request is received by the server 110 or other suitable component associated with the primary cloud print service 102 from a user associated with the user device 108. According to one embodiment of the subject application, the request received by the server 110 comprises a request for a document processing device location, an available document processing device, or the like.

Identification data is received at 304 via an application programming interface resident on the user device 108 that facilitates communications between the user device 108 and the primary cloud print service 102. It will be appreciated that such application programming interface is capable of being stored in memory 152 and implemented in accordance with operations of the processor 150 via the actions of an associated user. In one embodiment, a web-based service provided by the server 110 of the primary cloud print service 102 facilitates the receipt of identification data from the user device 108, e.g., via a web browser operable on the user device 108. The identification data may include information corresponding to a user ID, password, security certificate, or other suitable data capable of identifying an associated user. According to one embodiment, the identification data includes an OpenID, i.e., logon information that is shared amongst a plurality of applications, websites, service providers, mail services, or the like.

The server 110 may also receive data corresponding to the location of the user device 108 at 306. That is, the user device 108, via a GPS-based component, a cellular triangulation component, or other location-based service, may communicate the current location of the user device 108 to the primary cloud print service 102 via the above-mentioned application programming interface, browser, or the like. According to one embodiment of the subject application, the identification data and the location data are communicated via a suitable communications link, e.g., direct wireless connection, the Internet, a proprietary communication network, a cellular data connection, or the like.

At 308, the server 110 or other suitable component associated with the primary cloud print service 102 queries any trusted cloud print services 104 and 106 in accordance with the received request from the user device 108. At 310, the request from the user device 108 is relayed, along with any identification data and location data to each of the additional trusted cloud print services 104 and 106. In accordance with one embodiment, the primary cloud print service 102 may relay the request, i.e., call, to each of the trusted cloud print services 104 and 106 using a simple call, e.g., GetOpenDevices( ) or the like, that can accept location information for further customization of results. Each of the trusted cloud print services 104 and 106 that have received the relayed request determines, at 312, any available devices that correspond to the identification data and location data. That is, the respective servers 110 and 112 search the corresponding data storage 130 and 132 for the availability of the document processing devices 140-144 and 146-148.

According to one embodiment, the servers 112 and 114 determine those document processing devices 140-148 that are located within a predetermined distance, i.e., close proximity, to the user device 108 based upon the received location data. In accordance with another embodiment, the servers 112 and 114 associated with the trusted cloud services 104 and 106 determine whether any document processing devices 140-148 may be available to the public, i.e., available for non-subscribers, non-members, general public, etc., and are open to receiving document processing jobs.

At 314, the server 110 or other suitable component associated with the primary cloud print service 102 receives data from each trusted cloud service 104 and 106 corresponding to available document processing devices 140-148 in response to the query sent at 308. The server 110 or other suitable component aggregates, i.e., federates, all available document processing devices 134-148 into a federated listing at 316. In accordance with one embodiment of the subject application, the aggregation includes not only those document processing devices 140-148 available via the trusted cloud print services 104 and 106, but also those document processing devices 134-138 available via the primary cloud print service 102.

It will be appreciated that the aggregation of document processing devices at 316-318 is transparent to the user device 108, such that the user device 108 does not need to ascertain the identity of the cloud print service 102, 104, or 106 that are making the document processing devices 134-148 available. That is, the federated listing of devices 134-148 only illustrates the document processing devices 134-148, and not the cloud 102, 104, or 106 with which the devices 134-148 are associated.

At 318, the server 110 or other component associated with the primary cloud print service 102 communicates the federated listing of available document processing devices 134-148 to the user device 108 in response to the request received at 302. According to one embodiment, the federated listing of devices 134-148 may include only a limited number of devices associated with the clouds 102, 104, or 106, or none from any one particular cloud, e.g., the cloud has no available document processing devices or the cloud does not have a document processing device that is physically close enough with respect to the location data associated with the user device 108.

Selection data is received at 320 corresponding to a selection of one of the available document processing devices 134-148 by the primary cloud print service 102. That is, the server 110 or other suitable component associated with the primary cloud print service 102 receives a selection via the user device 108 indicating a selection by the associated user of one of the document processing devices 134-148 contained in the federated listing. Job data is then received at 322 corresponding to a document processing operation to be performed by the selected document processing device 134-148. It will be appreciated that the job data may originate from the user device 108, may correspond to a document associated with the identification data that is stored in data storage 128, 130, or 132 of one of the cloud print services 102, 104, or 106, may correspond to a particular web page selected for output via the user device 108, or the like. According to one embodiment of the subject application, the job data may utilize a job print ticket schema so as to provide for standardized submission. The job data is then communicated at 324 by the server 110 of the primary cloud print service 102 to the selected document processing device 134-138 if associated with the primary cloud print service 102, or to the server 112 or 114 of the selected cloud print service 104 or 106 with which is associated the selected document processing device 140-148.

According to one embodiment, the selected document processing device 134-148 then performs a document processing operation on the job data in accordance with any instructions contained within the communicated job data. At 326, status data is received by the server 110 or other suitable component associated with the primary cloud print service 102 that corresponds to the progress of the operation being performed by the selected device 134-148. According to one embodiment, the status data may include, for example and without limitation, whether the job is completed, time to completion, errors, successful transmission (if facsimile or email), or the like. It will be appreciated that when the selected document processing device 134-148 is associated with the primary cloud print service 102, data corresponding to the status of the job is received from the document processing device 134-138. It will further be appreciated that when the selected document processing device 140-148 is associated with the trusted cloud print services 104 or 106, status data is communicated from the device 140-148 to the respective server 112 or 114 and thereafter to the server 110 of the primary cloud print service 102. The status information is then communicated by the server 110 or other suitable component of the primary cloud print service 102 at 328 to the user device 108 for display thereon via the application programming interface, to a webpage hosted by the server 110 and accessible by the browser of the device 108, or any other suitable communication means, e.g., text message, email, and the like.

Figure 4:
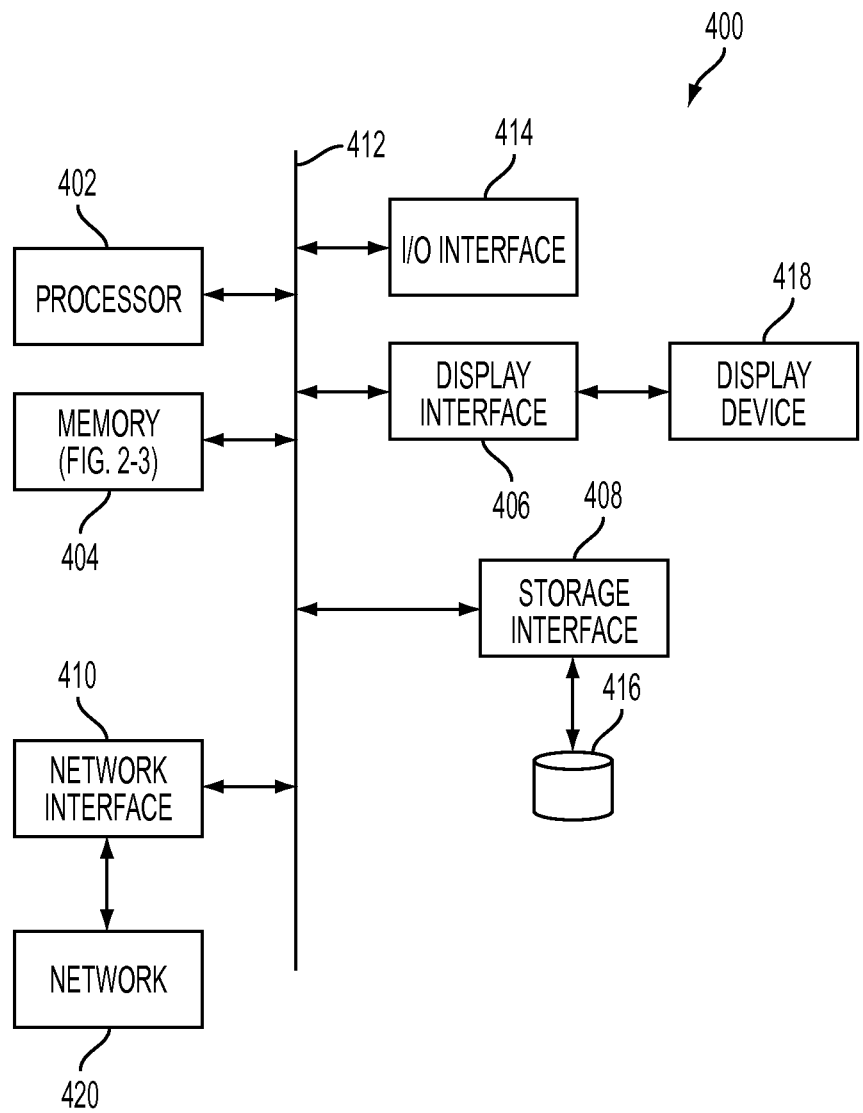
FIG. 4 illustrates a computing system that is capable of implementation to facilitate the federation among cloud print services in accordance with one embodiment of the subject application.

Turning now to FIG. 4, illustrated is a representative computer system 400 (depicted in FIG. 1 as the servers 110, 112, and 114) that facilitates federation of cloud print services in connection with one embodiment of the subject application. The computer system 400 includes a processor unit 402 which is advantageously placed in data communication with memory 404, which may include, for example and without limitation, non-volatile read only memory, volatile read only memory, random access memory or a combination thereof, a display interface 406, a storage interface 408, and a network interface 410. In one embodiment, interface to the foregoing modules is suitably accomplished via a bus 412. The processor 402 executes, and the memory 404 stores computer-executable instructions for performing the various functions, methods, steps, techniques, and the like, described herein. The processor 402 and memory 404 may be integral to each other or remote but operably coupled to each other.

The memory 404 suitably includes firmware, such as static data or fixed instructions, such as BIOS, system functions, configuration data, and other routines used for operation of the computer system 400 via the processor 402. The memory 404 is further capable of providing a storage area for data and instructions associated with applications and data handling accomplished by the processor 402.

The display interface 406 receives data or instructions from other components on the bus 412, which data is specific to generating a display to facilitate a user interface. The display interface 1106 suitably provides output to a display device 418, suitably a video display such as a monitor, LCD, plasma, or any other suitable visual output device as will be appreciated by one of ordinary skill in the art.

As will be appreciated by those skilled in the art, the storage interface 408 is configured to provide a mechanism for non-volatile, bulk or long term storage of data or instructions in the computer system 400. The storage interface 408 suitably uses a storage mechanism, such as storage 416, suitably comprised of a disk, tape, CD, DVD, or other relatively higher capacity addressable or serial storage medium.

The network interface 410 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration, the network interface 410 connected to a physical network 420, suitably comprised of a local area network, wide area network, or a combination thereof.

An input/output interface 414 in data communication with the bus 412 is suitably connected with input devices, such as a keyboard, mouse, pointing device, touch screen inputs, or the like. In addition, the input/output interface 414 is further capable of data output to a peripheral interface, such as a USB, universal serial bus output, SCSI, IEEE 1394 output, or any other interface as may be appropriate for a selected application.

Figure 5:
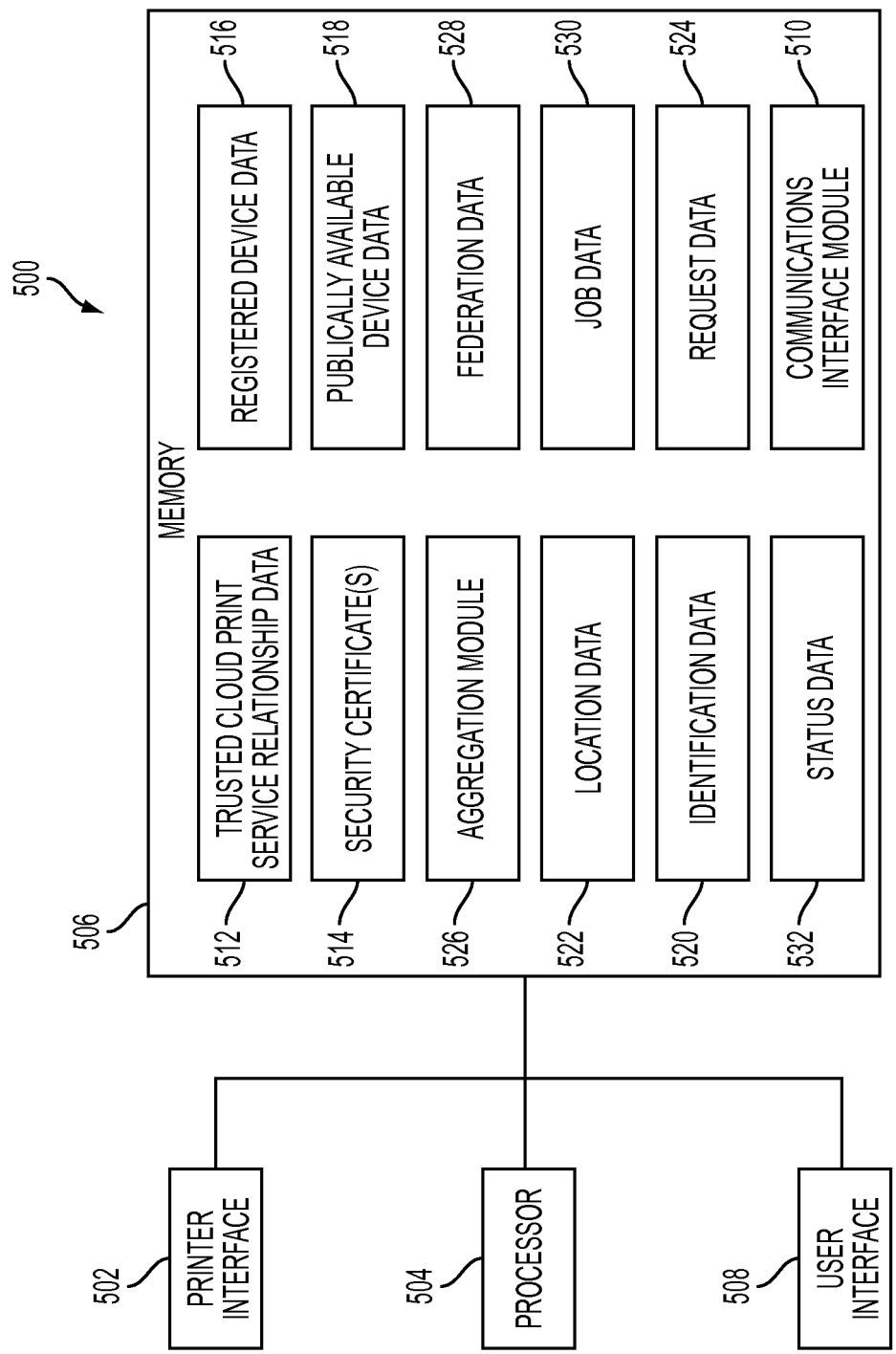
FIG. 5 illustrates a system that facilitates federation among cloud print services in accordance with one embodiment of the subject application.

FIG. 5 illustrates a system 500 that facilitates federation of document processing devices among cloud print services in accordance with one embodiment of the subject application. The system 500 comprises a printer interface 502 that is coupled to a processor 504 that executes, and a memory 508 that stores computer-executable instructions for performing the various functions, methods, techniques, steps, and the like, described herein. The processor 504 and the memory 508 may be integral to each other or remote but operably coupled to each other. In another embodiment, the processor 504, memory 508, and printer interface 502 may reside in a single computing device that is capable of facilitating the federation of document processing devices among cloud print services. In accordance with one embodiment, the system 500 includes a user interface 508, so as to enable interactions with an associated user, display information thereto, receive information therefrom, and the like.

According to one embodiment of the subject application, the system 500 comprises the processor 504 that executes, and the memory 508 that stores one or more computer-executable modules (e.g., programs, computer-executable instructions, objects, etc.) for performing various functions, methods, procedures, and the like, as described herein. Additionally, "module," as used herein, denotes application specific hardware, a set of computer-executable instructions, software code, a program, a routine, or other computer-executable means for performing the described function, or a suitable combination thereof, as will be appreciated. Furthermore, or alternatively, one or more of the functions described hereinafter with respect to the modules may be manually performed.

The memory 508 may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The system 500 further includes a communications interface module 510 that is executed by the processor 504 to facilitate communications amongst varying devices (not shown) capable of communication with the system 500 of FIG. 5. According to one embodiment, the communications interface module 510 facilitates communication with one or more like systems, located across varying networks, clouds, communications links, and the like. The communications module 510 is configured, to communicate with one or more cloud printing services 512 with which the system 500 may be in a trusted relationship. The communications module 510 further facilitates the establishment of trusted relationships 512 via the exchange of security certificates 514, so as to enable secure communications therebetween.

The system 500 also includes registered device data 516 and publically available device data 518. The registered device data 516 corresponds to document processing devices associated with specific identification data 520, as discussed in greater detail below. According to one embodiment, the registered device data 516 may include the location and capabilities, as well as authorizations associated with a specific document processing device with which the system 500 is in data communication. The publically available device data 518, according to one embodiment, corresponds to an identification of one or more document processing devices in data communication with the system 500 which may be available for use by non-registered users, as discussed above. The memory 508 of the system 500 further stores location data 522 corresponding to a physical location the document processing devices associated with the registered device data 516 and the publically available device data 518. It will be appreciated that suitable location data 522 may include, for example and without limitation, GPS coordinates, address, floor, or other such information that indicates the location of such devices.

The communications module 510 is further configured to receive requests 524 from an associated user device (not shown) corresponding to the use of cloud printing services facilitated by the system 500. In accordance with one embodiment of the subject application, such request data 524 includes identification data associated with a user initiating the request and location data corresponding to the physical location of the user initiating the request. Upon receipt of the request via the communications module 510, the processor 504 analyzes the trusted service data 512 to ascertain those cloud services with which the system 500 has a trusted relationship. The processor 504 then enables an aggregation module 526 to aggregate all cloud services available for responding to the received request data 524. The aggregation module 526, via operations of the processor 504, generates federation data 528 representing a federated list of cloud services available for responding to the request data 524. The communications module 510 returns this federated data 528 to the requesting device for selection of one of the cloud services 512.

Once selection of a cloud service 512 has been received via the communications module 510, the cloud service 512 is contacted for a list of registered devices 516 associated with the identification data 520. The system 500 then facilitates, via the communications module 510, communicating the registered devices 516 to the requesting device for selection. After selection, the communications module 510 enables the communication of job data 530 to the selected device on the selected cloud service 512. Status data 532 is received during processing of the job data 530 and made available to the requesting device via operations of the communications interface module 510.

In the event that the request 524 corresponds only to a request for a document processing device that is proximate to the user, i.e., the user does not request a particular cloud service 512, the processor 504, via the communications module 510, queries each trusted cloud print service 512 using the received location data 522 for any corresponding document processing devices. According to one embodiment, the query also includes a request for those devices that are publically available for use in accordance with stored availability data 518. The device data returned in response to the query is then aggregated by the aggregation module 526 so as to generate federation data 528. The federation data 528 is then communicated to the requesting device via the communications module 510. Thus, the available document processing devise are presented to the requesting device independent of their respective association to any particular cloud service 512. Upon selection of a device, the processor 504, via operations of the communication module 510, communicates job data 530 to the cloud service 512 on which resides the selected device. The job associated with the job data 530 is then processed, with status data 532 returned via the communications module 510 and made available to the requesting device.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A federation method among cloud print services, comprising:

with a processor, designating a selected one of a plurality of cloud print services a s a primary cloud print service associated with the user, wherein each cloud print services includes at least one document processing device registered therewith;

receiving identification data representative of an identification of an associated user via the primary cloud print service;

establishing a trusted relationship between the primary cloud print service and each of one or more additional cloud print services, wherein the trusted relationship is established via a token exchange or a certificated exchange between the primary cloud print service and at least one of the one or more additional cloud print services, and wherein a trusted relationship is extended between the primary cloud print service and an other cloud print service in accordance with only an established trusted relationship between the at least one of the one or more additional cloud print services and the other cloud print service;

storing, in a database associated with the primary cloud print service and a database associated with each of the one or more additional cloud print services, data representative of the established trusted relationships;

aggregating data representative of one or more additional trusted cloud print services by the primary cloud print service so as to generate a federation of trusted cloud print serves, the federation including the primary cloud print service;

receiving selection data corresponding to a trusted cloud print service selected from among the federation trusted cloud print services;

retrieving, from the selected additional trusted cloud print service, data representative of at least one document processing device separate from the loud print service registered in accordance with the received identification data;

aggregating data representative of each document processing device available from the primary cloud print service and each of the one or more additional cloud print services having a trusted relationship therewith into a list of available document processing devices, wherein the aggregated list available document processing devices is transparent to the associated user such that each document processing device is listed as associated with the selected cloud print service regardless of the cloud print service to the which the document processing device is registered;

receiving selection data corresponding to a selected document processing device associated with the selected cloud print service from the aggregated list thereof; and communicating job data representative of a document processing operation to the selected document processing device for processing thereon.

2. The method of claim 1, wherein the retrieving of document processing device data further comprises:

querying the selected additional trusted cloud print service in accordance with received identification data for at least one document processing device registered in accordance therewith; and receiving, in response to the query, data representative of at least one document processing device associated with the selected cloud print service registered in accordance with the received identification data.

3. The method of claim 1, further comprising:

receiving, by the primary cloud print service, the job data representative of the document processing operation for the selected document processing device from an associated user device;

receiving status data representative of a status of processing of the job data by the selected document processing device by the primary cloud print service from the selected additional trusted cloud print service; and communicating received status data to the associated user device.

4. The method of claim 1, wherein the identification data comprises at least one of an open identification, a username and a password.

5. A system for federating cloud print services comprising memory which stores instructions for performing the method of claim 1 and a processor in communication with the memory for executing the instructions.

6. A computer program product comprising a non-transitory recording medium storing instructions, which when executed by a computer causes the computer to perform the method of claim 1.

7. The method of claim 1, further comprising:

receiving registration data from the associated user of at least one additional document processing device, the registration data including a selection corresponding to the primary cloud print service or the one or more additional cloud print services for registration thereof; and registering the at least one additional document processing device with the selected cloud print service in accordance with the received registration data, wherein the received selection data corresponds to the at least one additional document processing device associated with the selected cloud print service.

8. A method for federating document processing devices among cloud print services, comprising:

with a processor, designating a selected one of a plurality of cloud print services as a primary cloud print service associated with the user, wherein each cloud print services includes at least one document processing device registered therewith;

receiving a request to initiate cloud printing by a primary cloud printing service, the request comprising at least one of identification data and location data;

exchanging, between the primary cloud print service and one or more additional cloud print services, a token or certificate to establish a trusted relationship between the primary cloud print service and at least one of the one or more additional cloud print service, wherein a trusted relationship is extended between the primary cloud print service and an other cloud print service in accordance with only an established trusted relationship between the other cloud print service and the at least one of the one or more additional cloud print services;

storing, in database associated with the primary cloud print service and a database associated with each of the one or more additional cloud print services, data representative of the established trusted relationships;

querying at least one additional trusted cloud print service in accordance with the received at least one of identification data and location data for at least one document processing device available in accordance therewith;

aggregating data representative of one or more available document processing devices on, and separate from, each cloud printing service in response to the query thereof by the primary cloud print service;

aggregating data representative of each document processing device available from the primary cloud print service and available from each of the one or more additional cloud print services having a trusted relationship therewith into a list of available document processing devices, wherein the aggregated list of document processing devices is transparent to the associated user such that each document processing device is listed as associated with the selected cloud print service regardless of the cloud print service to which the document processing device is registered;

receiving selection data corresponding to a selected document processing device from among the one or more available document processing devices from the aggregated list thereof; and communicating job data representative of a document processing operation to the selected document processing device for processing thereon.

9. The method of claim 8, further comprising receiving location data corresponding to a location of the associated user, wherein the querying further comprises querying the at least one additional trusted cloud print service for at least one document processing device available relative to the received location data.

10. The method of claim 9, further comprising:
receiving a request from the associated user for a document processing device in accordance with a location associated therewith; and
relaying the received request and location data to the at least one trusted cloud print service.

11. The method of claim 10, wherein the aggregation is performed in accordance with the received identification data and the received location data.

12. The method of claim 10, wherein the one or more available document processing devices are publically available document processing devices.

13. The method of claim 8, wherein the identification data comprises at least one of an open identification, a username and a password.

14. A system for federating document processing devices of cloud printing services comprising memory which stores instructions for performing the method of claim 8 and a processor in communication with the memory for executing the instructions.

15. A computer program product comprising a non-transitory recording medium storing instructions, which when executed by a computer causes the computer to perform the method of claim 8.

16. The method of claim 8, further comprising:
receiving registration data from the associated user of at least one additional document processing device, the registration data including a selection corresponding to the primary cloud print service or the one or more additional cloud print services for registration thereof; and
registering the at least one additional document processing device with the selected cloud print service in accordance with the received registration data, wherein the received selection data corresponds to the at least one additional document processing device associated with the selected cloud print service.

17. A system for federating document processing devices among cloud print services, comprising:
a processor;
memory that stores data. representative of trusted relationships among one or more cloud print services; and
a communications interface operative to communicate data among the one or more cloud print services,
wherein the memory is in communication with the processor, which stores instructions which are executed by the processor for:
establishing a trusted relationship with at least one additional cloud print service via an exchange of at least one of tokens or certificates with the at least one additional cloud print services via the communications interface,
extending a trusted relationship to an other cloud print service in accordance with only an established trusted relationship between the other cloud print service and the at least one additional cloud print service,
storing, in each of a plurality of databases associated with each of the one or more cloud print services, one or more established trusted relationship between the one or more cloud print services,
receiving a request to initiate cloud printing, wherein the request includes at least one of identification data and location data,
aggregating data representative of trusted cloud print services in accordance with the one or more established trusted relationships stored on at least one of the plurality of databases so as to generate a federation thereof,
receiving selection data corresponding to a selected cloud print service from among the federation of trusted cloud print services,
retrieving, from the selected trusted cloud print service, data representative of at least one document processing device separate from the cloud print services and registered in accordance with the received identification data,
aggregating data representative of each document processing device available from the primary cloud print service and from each trusted cloud print service into a list thereof, wherein the aggregated list of document processing devices is transparent such that each document processing device is listed as associated with the selected trusted cloud print services regardless of the cloud print service to which the document processing device is registered;
receiving selection data corresponding to a selected document processing device associated with the selected trusted cloud print service, from the aggregated list thereof, and
communicating job data representative of a document processing operation to the selected document processing device for processing thereon.

18. The system of claim 17, wherein the memory further stores instructions which are executed by the processor for:
querying each trusted cloud print service in accordance with the received location data for data representative of at least one document processing devices from each of the trusted cloud print services based upon a location of the document processing device with respect to the location data,
wherein the available document processing devices aggregated in the list thereof are indentified on each cloud printing service in response to the query thereof; and
receiving selection data corresponding to a selected document processing device from among the one or more available document processing devices,
wherein the job data is communicated to the selected document processing device in accordance with the received selection data for processing thereon.

19. The system of claim 18, wherein the memory further stores instructions which are executed by the processor for
receiving status data corresponding to the processing of the job data by the selected document processing device; and
communicating received status data to at least one of a user device or a web-based interface accessible in accordance with the received identification data.

20. The system of claim 19, wherein the status data comprises at least one of a job completion indication, a time to completion, an error or a successful transmission.

* * * * *